US011516128B2

(12) United States Patent
Chu et al.

(10) Patent No.: US 11,516,128 B2
(45) Date of Patent: *Nov. 29, 2022

(54) USER EXPERIENCE ORIENTED PATH SELECTION

(71) Applicant: Citrix Systems, Inc., Fort Lauderdale, FL (US)

(72) Inventors: Xiaolu Chu, Nanjing (CN); Jinren Zhang, Nanjing (CN); Jie Zhuang, Nanjing (CN); Tao Zhan, Nanjing (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/091,311

(22) Filed: Nov. 6, 2020

(65) Prior Publication Data

US 2021/0058319 A1    Feb. 25, 2021

Related U.S. Application Data

(63) Continuation of application No. 16/420,808, filed on May 23, 2019, now Pat. No. 10,904,143, which is a
(Continued)

(51) Int. Cl.
*H04L 45/00* (2022.01)
*H04L 43/0852* (2022.01)
(Continued)

(52) U.S. Cl.
CPC .......... *H04L 45/70* (2013.01); *G06F 9/45558* (2013.01); *H04L 43/0817* (2013.01);
(Continued)

(58) Field of Classification Search
CPC . H04L 45/12–127; H04L 45/22; H04L 67/02; H04L 67/1002; H04L 67/327; G06F 16/957; G06F 16/9574
See application file for complete search history.

(56) References Cited

U.S. PATENT DOCUMENTS 7,127,492 B1 * 10/2006 Calo ................... H04L 67/1008
709/214
2009/0185492 A1    7/2009 Senarath et al.
(Continued)

FOREIGN PATENT DOCUMENTS

| CN | 101964996 A | 2/2011 |
| CN | 103237331 A | 8/2013 |
| EP | 1788490 A1 | 5/2007 |

OTHER PUBLICATIONS

Jul. 19, 2021—(EP) Communication with Supplementary European Search Report—App 19915585.
(Continued)

*Primary Examiner* — Pao Sinkantarakorn
(74) *Attorney, Agent, or Firm* — Banner & Witcoff, Ltd.

(57) ABSTRACT

Methods and systems for path selection involving remote access protocols and/or user behavior are described herein. A request, from a first computing device, for content hosted on a second computing device may be received. Based on network state metrics, remote access protocol metrics, and/or user experience metrics, a path of a plurality of paths between the first computing device and the second computing device may be selected. The path need not be the most direct path between the first computing device and the second computing device, and may comprise remote access to a computing device on an intermediary server. Based on user behavior analysis performed with respect to user input data, a path may be re-selected, and/or the network state metrics, remote access protocol metrics, and/or user experience metrics may be weighted.

20 Claims, 9 Drawing Sheets

Related U.S. Application Data continuation of application No. PCT/CN2019/077609, filed on Mar. 11, 2019.

(51) Int. Cl.
  *G06F 9/455* (2018.01)
  *H04L 43/0817* (2022.01)
  *H04L 67/50* (2022.01)

(52) U.S. Cl.
  CPC ........ *H04L 43/0852* (2013.01); *H04L 67/535* (2022.05); *G06F 2009/45595* (2013.01)

(56) References Cited

U.S. PATENT DOCUMENTS

| | | | |
|---|---|---|---|
| 2014/0269269 A1 | 9/2014 | Kovvali et al. | |
| 2014/0280906 A1* | 9/2014 | Johns | H04L 45/14 709/224 |
| 2015/0039684 A1 | 2/2015 | Salkintzis et al. | |
| 2015/0154506 A1* | 6/2015 | Jain | H04L 67/2819 706/12 |
| 2015/0271087 A1 | 9/2015 | Yiu et al. | |
| 2015/0319076 A1 | 11/2015 | Vasseur et al. | |
| 2016/0216845 A1* | 7/2016 | Venkatesh | G06F 3/0481 |
| 2018/0234518 A1 | 8/2018 | Zhu et al. | |
| 2018/0278570 A1 | 9/2018 | Dhanabalan | |
| 2020/0228437 A1* | 7/2020 | Srinivasa Murthy | H04L 41/22 |

OTHER PUBLICATIONS

Dec. 18, 201 (WO) International Search Report—App. PCT/CN2019/077609.

May 26, 2020—U.S. Non-final Office Action—U.S. Appl. No. 16/420,808.

Sep. 23, 2020—U.S. Notice of Allowance—U.S. Appl. No. 16/420,808.

* cited by examiner

USER EXPERIENCE ORIENTED PATH SELECTION

CROSS-REFERENCE TO RELATED APPLICATIONS

The present application is a continuation of U.S. patent application Ser. No. 16/420,808, filed May 23, 2019, entitled "User Experience Oriented Path Selection,", which claims priority to International Application No. PCT/CN2019/077609, filed Mar. 11, 2019, and entitled "User Experience Oriented Path Selection," which are hereby incorporated by reference as to their entirety.

FIELD

Aspects described herein generally relate to computer networking, such as network path selection, network state metrics, remote access to computing devices, and user input monitoring.

BACKGROUND

Typical protocols for delivering content over a network (e.g., Hypertext Transfer Protocol (HTTP)) are often undesirably slow. Such slowness is particularly the case over long distances and where requested content (e.g., a web page) requires a large number of requests and/or where the content itself is large. For example, a computer user in China may access a web application hosted on a server in the United States, such that retrieval of any given element from the server may take 300 milliseconds. In such an example, because the web application may comprise a large number of elements (e.g., Hypertext Markup Language (HTML) code, Cascading Style Sheets (CSS), images, video content, and the like), each element may entail 300 milliseconds of delay, meaning that a user may experience significant delay when accessing the web application.

Remote access systems (e.g., servers which allow users to access applications hosted on the server from a remote computing device) have become increasingly popular, particularly as network speeds and capabilities have improved. For example, a user on a relatively weak computing device (e.g., a thin client) might remotely access an application executing on a relatively powerful server and thereby use the application as if the relatively weak computing device was executing the application. As another example, a user might use a remote web browser to access a web page, such that the user's connection to the web page involves at least two hops: a first hop via a remote access protocol to the server executing the web browser, and a second hop via the web browser and via a different protocol from the server to a second server hosting the web page.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

As described above, remote access scenarios are often reliant on the speed and reliability of network connections between computing devices (e.g., the relatively weak computing device and the relatively powerful server). But establishing and using such remote access applications can be time-consuming and difficult, particularly for users unfamiliar with the technology. Moreover, changes in network conditions and user needs may mean that the right method of accessing content (e.g., directly, via a remote web browser hosted on an intermediary computing device, or via a second remote web browser hosted on a different intermediary computing device) may change.

To overcome these limitations, and to overcome other limitations that will be apparent upon reading and understanding the present specification, aspects described herein are directed towards path optimization, using remote access protocols, in networks. A request, by a first computing device, for content on a second computing device may be received. The request may be for, e.g., a web page hosted on the second computing device. Network state metrics, such as latency, bandwidth, and the like, may be determined for one or more paths between the first computing device and the second computing device. Such paths may comprise, e.g., routers, switches, intermediary servers, and the like. Remote access protocol metrics, such as latency information for remote access protocols between a remote access client and a remote access server, may be determined. Based on the network state metrics and the remote access protocol metrics, user experience metrics may be determined. Such user experience metrics may comprise determining, from a plurality of paths in the network between the first computing device and the second computing device, one or more paths which may provide an optimized user experience. Based on the network state metrics, the remote access protocol metrics, and the user experience metrics, a path may be selected, and the first computing device may access the content via the path. The path may comprise using a remote access protocol to access an application on an intermediary server. For example, the path may comprise the first computing device using a remote access protocol to access a web browser application executing on an intermediary computing device, wherein the web browser application is used by the first computing device to access the content on the second computing device. User input data from the first computing device may be received and, based on a user behavior analysis performed based on such user input data, it may be determined that the user experience via the path is poor. Based on such a determination, one or more reasons for the poor user experience may be determined, and a new path may be selected.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
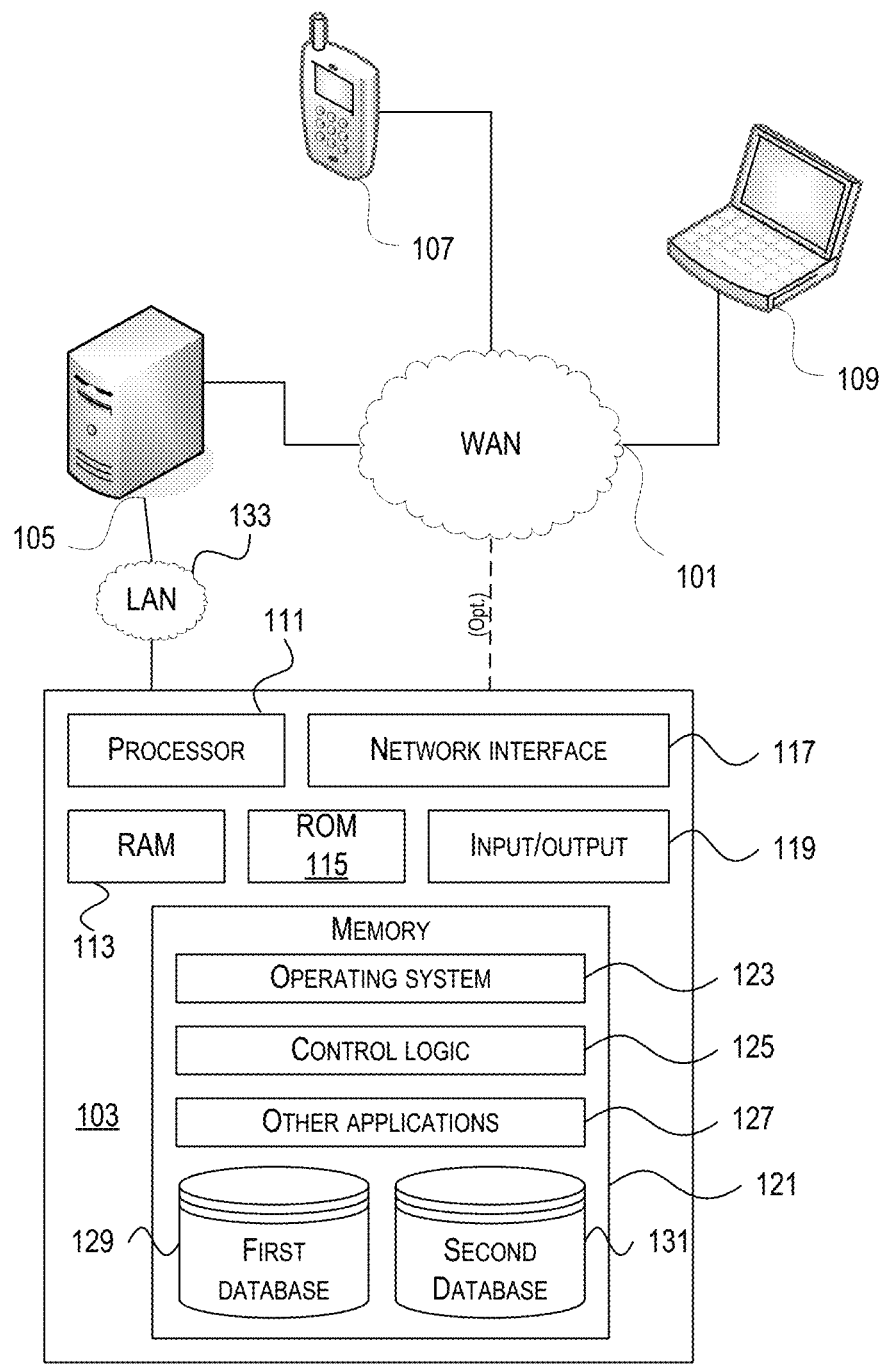
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards improving access to content on a network using remote access protocols. Computing devices may be configured to deliver content, such as a web page. Computing devices may additionally and/or alternatively be configured to provide remote access to applications, such as web browsers, and such applications may request and retrieve content from other computing devices. In this manner, a computing device may use an application on an intermediate computing device, via a remote access protocol, to access content on a second computing device.

A user that uses a computing device to access content on a second computing device over a network may have their experience adversely impacted by poor network conditions. For example, a user in China that attempts to access a web page hosted in the United States may find that the latency associated with the distance between the two countries may cause an undesirable amount delay in loading the web page. In some circumstances, the aforementioned delay may be improved by using an intermediary connection and/or a remote access protocol (e.g., remotely accessing a web browser on an intermediary computing device in Germany, then using that web browser to load the aforementioned web page), but determining that latency may be improved using such a method and establishing such a connection may be prohibitively difficult and/or time consuming. Moreover, even if one method (e.g., using the remote web browser to access a web page) does improve the user's experience, changing network conditions (e.g., less traffic on a network) may mean that a different method (e.g., directly accessing the web page) may result in a better user experience at a later time.

Aspects described herein relate to path optimization in networks and using remote access protocols. By evaluating network state metrics, remote access protocol metrics, and/or user experience metrics, a path, of a plurality of paths, may be selected which improves access to content. Based on user input data retrieved with respect to the content, path selection may be further improved. Additionally, aspects described herein may learn from user experience (e.g., whether or not a user has a poor experience with a given path) Thus, in the above example, a user may have an improved experience with access to content and need not manually determine and select one of a plurality of possible paths to the content. For example, a user may select an icon to open a web page and, for user experience reasons, access such a web page via a web browser executing on an intermediary computing device without specifically deciding to do so.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communications paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device.

The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
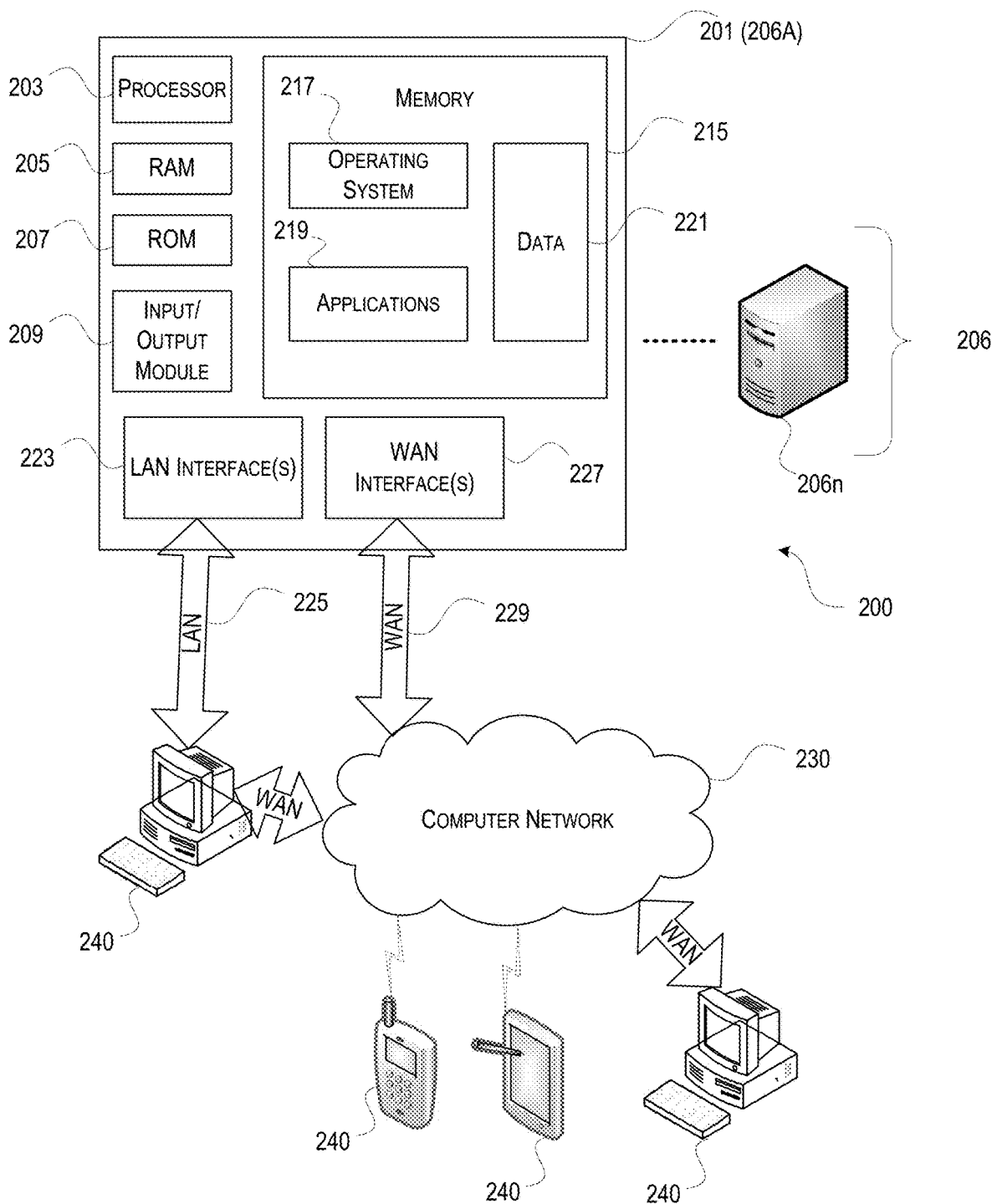
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
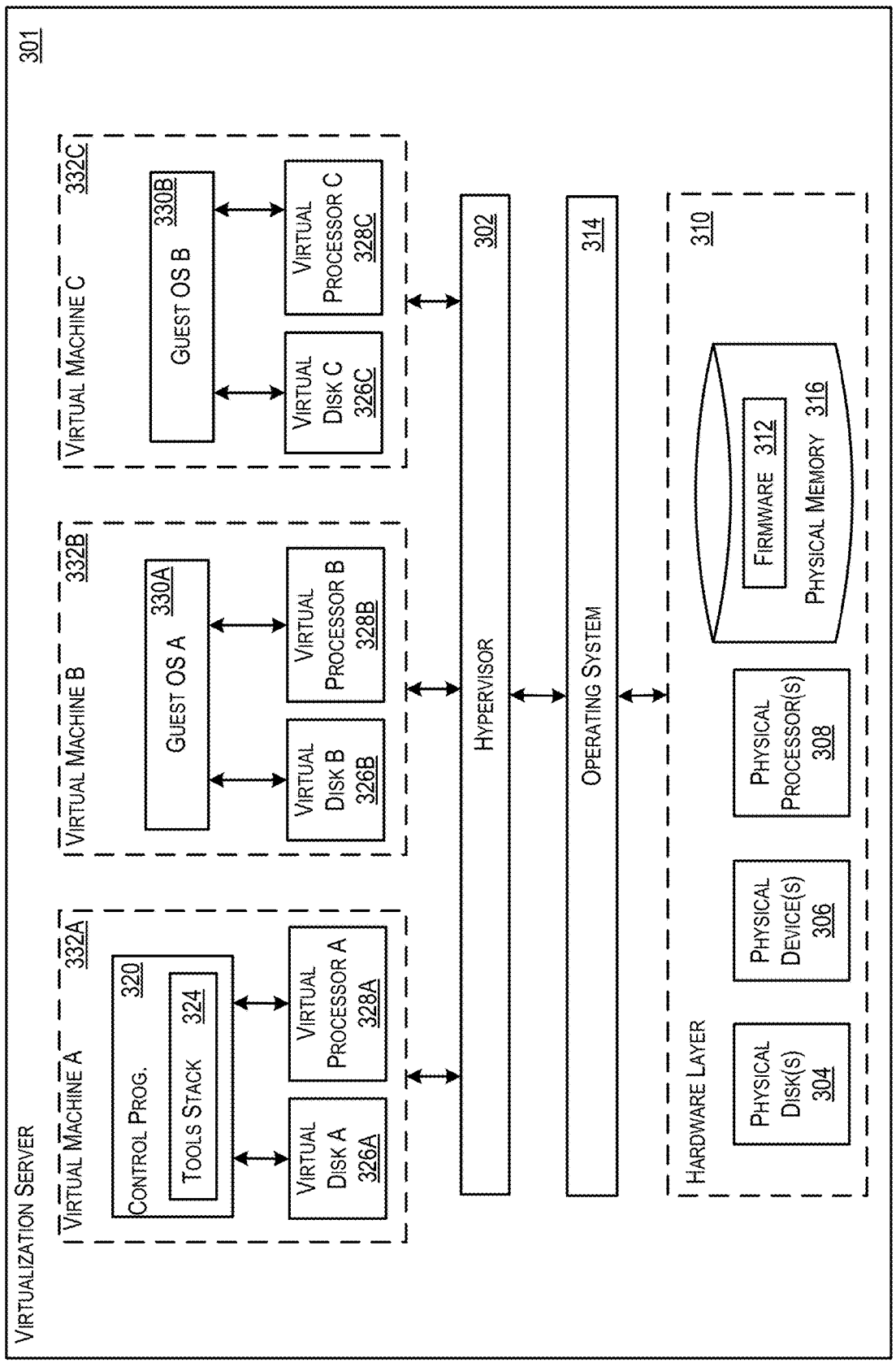
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Intermediated Retrieval of Content

Figure 4:
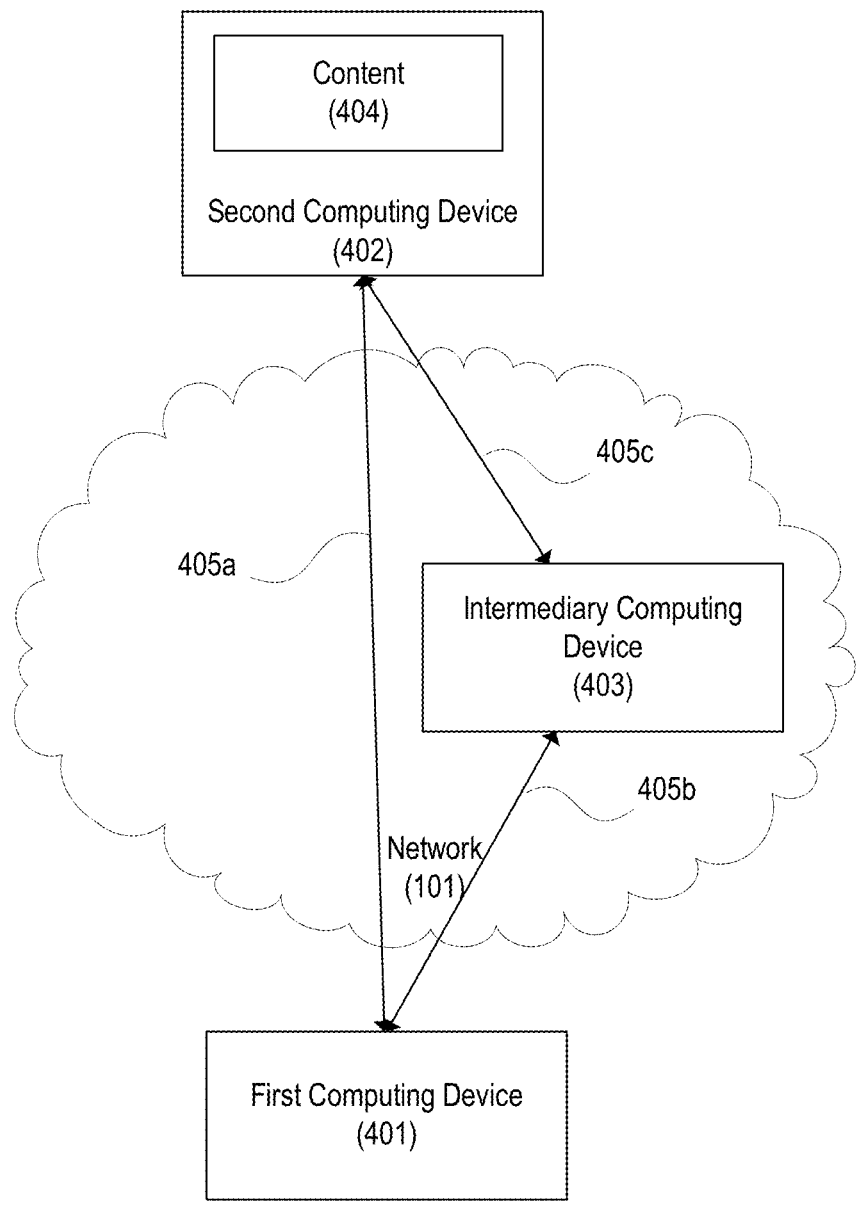
FIG. 4 depicts an illustrative remote access environment comprising a first computing device, a second computing device, and an intermediary computing device.

FIG. 4 shows a remote access environment in the network 101 comprising a first computing device 401, a second computing device 402, and an intermediary computing device 403. The first computing device 401, the second computing device 402, and the intermediary computing device 403 may be computing devices the same as or similar to the computing device 201. For example, the first computing device 401 may be a laptop, whereas the second computing device 402 and the intermediary computing device 403 may be servers. The first computing device 401, the second computing device 402, and the intermediary computing device 403 may be connected over the network 101. Communications over the network 101 may be via one or more protocols, such as HTTP (e.g., HTTP3, also referred to as "QUIC"), Transmission Control Protocol (TCP), User Datagram Protocol (UDP), or the like, including a combination thereof. The network 101 may comprise a variety of switches, routers, other computing devices, and the like, though these elements are not shown for simplicity.

The second computing device 402 may store content 404, which may be, e.g., a web page, application, or the like. Computing devices, such as the first computing device 401, may be configured to request the content 404 from the second computing device 402. The second computing device 402 may be configured to send the content 404 to one or more computing devices, such as the first computing device 401. Such communications may be via an application, such as a server operating system, a web browser, or the like. For example, the first computing device 401 may use a web browser to access the content 404, hosted by a server application executing on the second computing device 402, over the network 101.

The first computing device 401 may access the content 404 on the second computing device 402 via the intermediary computing device 403. An intermediary computing device, such as the intermediary computing device 403, may be a computing device configured to provide remote access to applications executing on the intermediary computing device, such as office suite applications, web browsers, and the like. The intermediary computing device 403 may comprise or use a virtualization server, such as the virtualization server 301. Such remote access may be via a remote access protocol, such as the ICA protocol. Applications provided over such a remote access protocol may be used to access content on other computing devices, such as the content 404 on the second computing device 402.

Each hop between two or more computing devices, such as the first computing device 401 and the second computing device 402, may be associated with network state metrics, such as a latency, a round trip time (RTT), a bandwidth, packet loss, web page loading time, and the like. As used herein, a hop may refer to a portion of a connection between a sending and receiving computing device such that, for example, transmissions between the first computing device 401 and the intermediary computing device 403 over a first protocol may comprise a first hop, whereas transmissions between the intermediary computing device 403 and the second computing device 402 may comprise a second hop. Such network state metrics may be associated with transmission delays (e.g., time required to transmit signal via wire), processing delays (e.g., delays associated with network interface cards in a computing device), routing delays (e.g., transmission of packets between different networks), physical limitations (e.g., a particular wire only being capable of transmitting so many packets per second), and the like. For example, a direct connection 405a between the first computing device 401 and the second computing device 402 may be associated with 300 milliseconds of latency. A first intermediate connection 405b between the first computing device and the intermediary computing device 403 may be associated with 300 milliseconds of latency. A second intermediate connection 405c between the intermediary computing device 403 and the second computing device 402 may be associated with 50 milliseconds of latency. The first intermediate connection 405b may be via a remote access protocol (e.g. the ICA protocol), whereas the second intermediate connection 405c may be via HTTP3. While the latency via the direct connection 405a may be less than the latency associated with the first intermediate connection 405b and the second intermediate connection 405c, a user may have a better experience with the first intermediate connection 405b and the second intermediate connection 405c as compared to the direct connection 405a. For example, because the video transmitted by the remote access protocol over the first intermediate connection 405b may be configured to mitigate the undesirable effects of latency, a user may perceive the connection via the first intermediate connection 405b and the second intermediate connection 405c as snappier as compared to the direct connection 405a. As another example, the content 404 may be a web page with a large quantity of elements, and the second intermediate connection 405c between the intermediary computing device 403 and the second computing device 402 may, because it is associated with a lower latency, make all of the various elements of the web page appear to load faster despite the fact that the first intermediate connection 405b and the second intermediate connection 405c have a total latency greater than the direct connection 405a.

Figure 5:
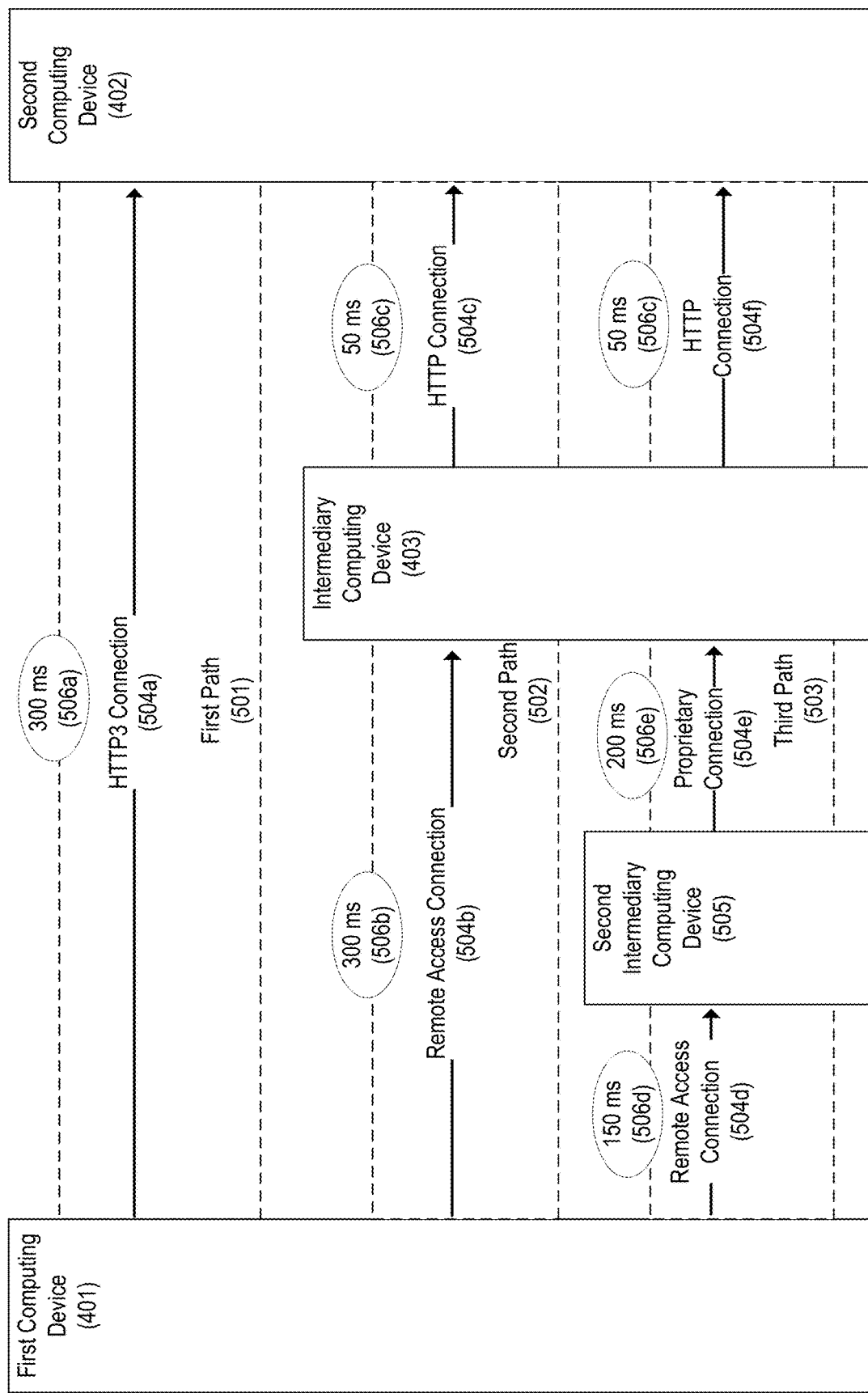
FIG. 5 depicts three illustrative paths between a first computing device and a second computing device.

FIG. 5 shows three paths between the first computing device 401 and the second computing device 402. Though only four computing devices are shown in FIG. 5, an infinite number of computing devices (e.g., switches, routers, or the like) may be involved in communications between the first computing device 401 and the second computing device 402. For example, a first path 501 is depicted in FIG. 5 as a direct line from the first computing device 401 to the second computing device 402; however, such a path may involve numerous switches, routers, and the like, including changes in protocol.

The first path 501 may comprise a single hop, a HTTP3 connection 504a, associated with a first latency 506a of 300 ms. The first path 501 may be referred to as a direct path because it does not comprise remote access to content via an intermediary computing device.

A second path 502 may comprise two hops. A first hop of the second path 502, a remote access connection 504b, may connect the first computing device 401 to the intermediary computing device 403. A second hop of the second path 502, an HTTP connection 504c, may connect the intermediary computing device 403 to the second computing device 402. The remote access connection 504b may be associated with a second latency 506b of 300 milliseconds, and the HTTP connection 504c may be associated with a third latency 506c of 50 milliseconds.

A third path 503 may comprise three hops. A first hop of the third path 503, a remote access connection 504d, may connect the first computing device 401 to a second intermediary computing device 505. A second hop of the third path 503, a proprietary connection 504e, may connect the second intermediary computing device 505 to the intermediary computing device 403. A third hop of the third path 503, an HTTP connection 504f, may connect the intermediary computing device 403 to the second computing device 402. The remote access connection 504d may be associated with a fourth latency 506d of 150 milliseconds, the proprietary connection 504e may be associated with a fifth latency 506e of 200 milliseconds, and the HTTP connection 504f may be associated with the third latency 506c of 50 milliseconds.

User experience may be improved through use of remote access connections. For example, a user of the first computing device 401 may load content on the second computing device 402 and have a better user experience by remotely accessing a web browser on the intermediary computing device 403 via the remote access connection 504b and loading the content in the remote browser via the HTTP connection 504c, rather than directly retrieving the content via the HTTP3 connection 504a. In other words, as discussed above, a user may have a better user experience loading content via an intermediary computing device (e.g., the intermediary computing device 403) as compared to directly retrieving such content. For example, packets transmitted via the first path 501 may result in a relatively poor Quality of Service (QOS) treatment across different networks, whereas packets transmitted via the third path 503 may receive a relatively better quality QOS treatment. As another example, the remote access connection 504b may be configured to mitigate the effects of the second latency 506b, such that the user may perceive loading of the content from the second computing device 402 to be faster despite the fact that the sum of the second latency 506b and the third latency 506c is greater than the first latency 506a.

The latency values shown in FIG. 5 may be influenced by a variety of factors, including the location of the computing devices, the processing and transmission speed of the computing devices, the physical properties of connections between the computing devices, and the like. For example, the latency improvements of the second path 502, as compared to the first path 501, may in part be realized because the remote access connection 504b may be treated with a higher QOS on some networks, because routers/switches in the second path 502 are faster and/or more powerful than those on the first path 501, because more bandwidth may be allocated to computing devices along the second path 502 than the first path 501, or the like.

Path Selection

Figure 6:
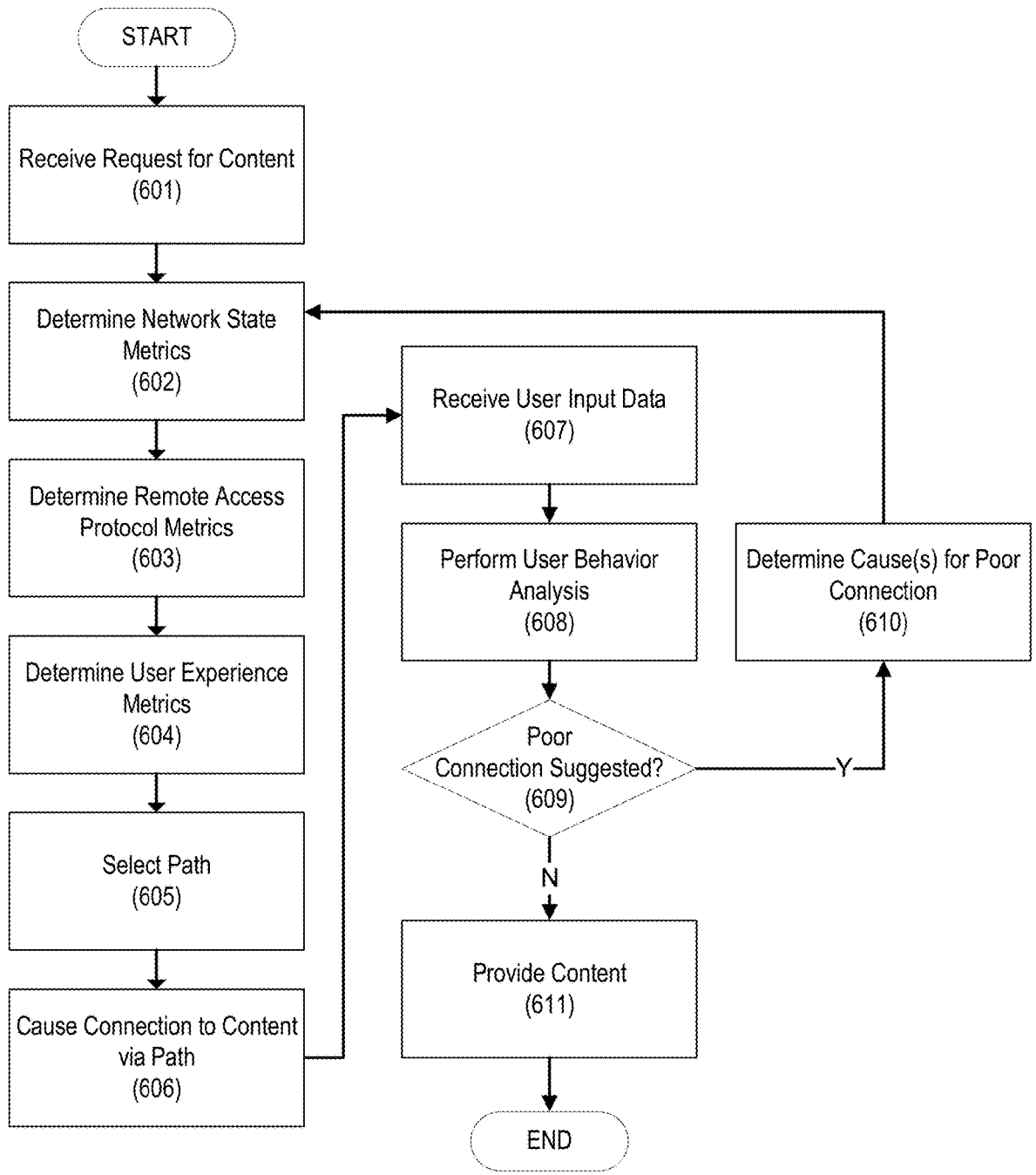
FIG. 6 is a flow chart which may be performed with respect to a first computing device and a second computing device.

FIG. 6 is a flow chart which may be performed with respect to the first computing device 401 and the second computing device 402. All or some of the steps shown in FIG. 6 may be performed by the first computing device 401, the second computing device 402, the intermediary computing device 403, and/or an administrative computing device. For example, all or some of the steps shown in FIG. 6 may be performed by the intermediary computing device 403 such that it may cause the first computing device 401 to connect through it to the second computing device 402.

In step 601, a request for content (e.g., the content 404 as stored by the second computing device 402) from a requesting computing device may be received or otherwise communicated. Additionally and/or alternatively, step 601 may comprise predicting that such a request for content may be likely (e.g., determining that a user of the computing device 401 has performed authentication steps required to connect with the second computing device 402) and/or otherwise determining the existence of a request for content. For example, the request for content may be a user of a computing device clicking on an icon and/or similar link associated with the content. The request for content may originate from the computing device hosting the content (e.g., the second computing device 402), such that the request for content may comprise an indication that, e.g., the second computing device 402 wishes to transmit the content to the first computing device 401. The request may be received via one or more intermediary computing devices such that, for example, the request for content may be received via an application executing in a remote access environment (e.g., as shown in FIG. 4). The request may be initiated by, for example, determining that a user is hovering over an icon, link, or similar user interface element associated with the content. The request may be initiated by a user logging into a service, such as a remote access service. The request may be based on manual indications by a user of desired content: for example, a user might indicate, using an application, that the user regularly uses certain remote applications.

In step 602, network state metrics may be determined. Metrics, such as the network state metrics, may provide information regarding one or more paths (including portions of such paths), and such metrics may be used to select a path amongst a plurality of available paths. For example, positive network state metrics (e.g., high bandwidth, low latency) for a path may encourage use of that path to retrieve content. Network state metrics may correspond to one or more paths (e.g., the first path 501, the second path 502, and/or the third path 503) in a network (e.g., the network 101). Network state metrics may be determined for a plurality of paths, including hops in one or more paths. For example, network state metrics may comprise bandwidth, RTT, and/or latency information for each hop in one or more paths between the first computing device 401 and the intermediary computing device 403. As another example, network state metrics may be collected for every hop in a network, a subset of hops in a network (e.g., those predicted to be used to connect the first computing device 401 and the second computing device 402), or the like. Network state metrics may be determined for a variety of protocols, such as HTTP, HTTP3, and the like, such that, e.g., a latency may be determined for HTTP3 and HTTP over the same hop in a path. Network state metrics may be based on information associated with a requesting computing device, such as a location of the requesting computing device, the Internet Protocol (IP) address of the requesting computing device, or the like.

In step 603, remote access protocol metrics may be determined. Remote access protocol metrics may comprise metrics the same or similar to the network state metrics but with respect to remote access to applications over a remote access protocol. For example, packets via a first protocol (e.g., HTTP3) may be associated with a latency of 200 milliseconds, whereas packets associated with a remote access protocol (e.g., ICA) may be associated with a latency of 100 milliseconds. This difference in latency may relate to different processing/transmission requirements associated with each protocol. As such, the remote access protocol metrics may correspond to latency, bandwidth, or similar measurements made between links using a remote access protocol. The remote access protocol metrics may also comprise other measurements associated with remote access to an application, such as frames per second video transmitted to a computing device using the remote access protocol to access an application, the CPU load and/or available memory of the computing device executing the remotely-accessed application, and the like. Such remote access protocol metrics may be determined by, e.g., a hypervisor, such as the hypervisor 302.

In step 604, user experience metrics may be determined for one or more paths. User experience metrics may be a quantification of a user's experience with content (e.g., the content 404) as provided over a network (e.g., the network 101). User experience metrics may comprise a weighted form of the network state metrics and the remote access protocol metrics associated with one or more paths, as weighted by the relative importance of such metrics for user experience. For example, because a user might more readily notice lag in a remote access environment as compared to lag when retrieving elements of a web page, remote access protocol metrics may be weighted as more important than network state metrics, such that low latency may be more important for paths delivering remote access protocol information (e.g., video and/or audio corresponding to a remote application) as opposed to paths delivering content (e.g., paths delivering HTTP content to the remote application). As will be described below, particularly with respect to FIG. 7 and FIG. 9, user experience metrics may be determined based on historical user behavior such that historical user experiences with various paths may influence how user experience metrics are determined.

One of the user experience metrics for a path may comprise a weighted sum of the network state metrics and/or the remote access protocol metrics associated with the path. For example, where the network state metrics and the remote access protocol metrics comprise latency measurements, a user experience metric may be found using the following formula, where $u_p$ is a user experience metric for a path, w is a unique weighting value, r is a remote access protocol latency, and n is a network state latency:

$$u_p = \sum_{i=0}^{I} w_i r_i + \sum_{j=0}^{J} w_j n_j$$

Weighting values, such as w in the above equation, may be determined based on the relative impact of a given network state metric and/or remote access protocol metric on user experience. For example, a relatively high remote access protocol latency may be undesirable because a user may more readily notice the latency (e.g., by detecting a delay in mouse movement using the first computing device 401 and a corresponding mouse movement in a video stream received from the intermediary computing device 403). As another example, and in contrast, a relatively high network state metric may be more permissible where the latency would correspond in delayed retrieval of content that need not be loaded immediately (e.g., content which is not displayed until the user has viewed other content for ten seconds).

Weighting values such as w may be dynamically adjusted, e.g., by a machine learning algorithm, based on a history of user experience and/or user behavior. If certain network state metrics and/or remote access protocol metrics are associated with poor user experience and/or undesirable user behavior (e.g., an increased likelihood that a user stops accessing the content, attempts to re-connect to the content, idly moves their mouse around without engaging with the content, etc.), such network state metrics and/or remote access protocol metrics may be weighted highly. As such, the user experience metrics may, over time, more accurately reflect the importance of particular paths and/or metrics with respect to user experience.

User experience metrics may be reproduced as value corresponding to whether a particular path, or portion of a path, has a satisfactory user experience. For example, a sigmoid transformation may be applied to the equation for $u_p$ provided above, such that the function ranges from 0 to 1, with 1 being satisfactory, 0 being unsatisfactory, and v being a variable which may be modified to define the range of values of u may be satisfactory or unsatisfactory:

$$y = \frac{1}{1+e^{-z}} \quad z = u_p + v = \sum_{i=0}^{I} w_i r_i + \sum_{j=0}^{J} w_j n_j + v$$

One or more thresholds may be established which define a good user experience versus a bad user experience. The value y in the above equation may output values in the range from zero to one, such that y approaches 1 as z approaches negative infinity, y approaches ½ as z approaches zero, and y approaches 0 as z approaches infinity. Values may be set such that y<0.5 may indicate an unacceptable user experience, and y>=0.5 may indicate an acceptable user experience. As another example, the constant v in the equation for y above may be modified such that y=0.5 is the minimum acceptable user experience, such that values below or equal to y=0.5 indicate an unacceptable user experience, and values above y=0.5 indicate an acceptable user experience. As another example, a predetermined value of u in the above equation may be determined as a minimum acceptable latency, such that any latency greater than that minimum acceptable latency may indicate an unacceptable user experience. The function above may be referred to as a sigmoid function and/or a logistic function.

In step 605, based on the network state metrics, the remote access protocol metrics, and/or the user experience metrics, a path may be selected. The path may be selected from a plurality of paths between, e.g., the first computing device 401 and the second computing device 402. For example, based on the network state metrics, the remote access protocol metric, and/or the user experience metrics, a network state calculation may be determined which comprises an estimation of user experience for each of a plurality of paths. The path selected need not be the path with the lowest latency and/or highest bandwidth, and may comprise the path associated with a highest user experience determination. For example, a relatively slower path may be selected if portions of the path more important for user experience (e.g., paths between the first computing device 401 and the intermediary computing device 403) are nonetheless faster as compared to other paths. As another example, step 605 may comprise making a user experience determination for a plurality of paths and selecting, from the paths, a path with the best user experience determination.

The selected path may be for the same or a different session, a group of users, a group of computing devices, or the like. A user may access content in one or more sessions, which may be discrete periods of time corresponding to different instances in which the user accesses content. Thus, a selected path for a first session (e.g., access to given content on Monday) may be different than a selected path for a second session (e.g., access to the same content on Tuesday). For example, the first computing device 401 may already be receiving first content from the second computing device 402, and the selected path may be for receipt of second content. As another example, the first computing device 401 may receive content from the second computing device 402 via a first path, and the selected path may be stored in memory for use when the first computing device 401 requests second content, in a different session, from the second computing device 402. The selected path may be used for all users and/or all computing devices in a predetermined group. For example, the path may be selected and stored for use for all computing devices located in China that request content from computing devices located in Canada. As another example, the path may be selected for all users associated with a particular tier of a subscription service. As another example, the path may be selected for all users in an office.

In step 606, the requesting computing device may be connected, via the path selected in step 605, to the content. Causing the connection may comprise transmitting, to the computing device, instructions to connect to an intermediary computing device, and/or may comprise instructions to an intermediary computing device to provide, to a computing device, remote access to an application. For example, the first computing device 401 may be connected, via the path, to the second computing device 402 by sending, to the first computing device 401, an instruction to connect to a particular server comprising a first hop in the selected path. As another example, an ICA file may be created such that, when the file is opened by the first computing device 401, the first computing device 401 establishes a connection, via a remote access protocol, with an intermediate computing device along the selected path.

Connecting a requesting computing device, via the path selected in 605, to the content may comprise presenting, and/or modifying, one or more user interface elements on the requesting computing device. For example, the first computing device 401 may show a plurality of icons, one corresponding to the content 404, and such an icon may be modified such that interaction (e.g., clicking, hovering over) with the icon causes access to the content 404 via the path selected in step 605. In this manner, the user of the requesting computing device need not know that the path is being selected. This may be advantageous to make access to the content appear seamless, and/or in environments where the user desiring the content is not particularly tech-savvy.

In step 607, user input data associated with access to the content may be received. Such user input data may comprise information regarding a user moving a mouse, typing on a keyboard, and/or otherwise engaging with the requested content. Such user input data may be received via an intermediary computing device, such as the intermediary computing device 403. For example, software executing on the intermediary computing device 403 enabling the intermediary computing device 403 to provide, to the first computing device 401, remote access to an application may also receive input data from the first computing device 401. Such user input data may be in any format, and may be summary data (e.g., clicks per minute, an indication of a time period when a user's mouse has not moved, or the like).

In step 608, a user behavior analysis may be performed. A user's behavior with respect to content may be reflective of whether their access to content is unsatisfactory. For example, if content is loading too slowly, a user may move the mouse around in absentminded patterns, may access a window different than a window associated with the content, may not provide any keyboard input for a predetermined period of time, or the like. Thus, a user behavior analysis may provide an indication that a new path selection may be desirable to improve the user's experience with the content. The user behavior analysis may comprise analyzing available data, such as user input data, to determine how a user is interacting with requested content. After a user has interacted with a first portion of content at a first time, a user may not interact with the same or a different portion of content at a second time because, e.g., the content is loading too slowly and/or is difficult to interact with. For example, the user input data may indicate that a user that formerly was interacting with the content is now idly moving their mouse without clicking or using a mouse wheel, that a long time has elapsed since the user typed anything into their keyboard or clicked a mouse, and/or where the user attempts to re-open and/or close a session with an intermediate computing device. Such user behavior may indicate, e.g., that the user experience with the content is poor, and that another path to retrieve the content may be necessary to improve the user's experience. Additionally and/or alternatively, the user behavior analysis may be performed based on network state metrics and/or remote access protocol metrics. For example, if the network state metrics indicate that data has been downloaded for a predetermined period of time (e.g., that a user has been trying to download the same content via the same path for longer than five minutes), and if the user input data suggests that the user is still active, the user may not be consuming content and therefore have a poor user experience.

Because user behavior may be the result of a large number of factors unrelated to the retrieval of content, the user behavior analysis may consider multiple factors, and may be configured to learn over time which of the multiple factors are indicative of issues with the retrieval of content via a given path. For example, based on learning that a user has a habit of idly moving a mouse while accessing websites, the user behavior analysis may be configured to ignore and/or discount such mouse movement. As another example, content by the user may have regions associated with mouse clicks (e.g., links on a web page), such that mouse clicks in such regions may be associated with content access, whereas mouse clicks outside of such regions may be indicative of issues with content access. The user behavior analysis may be additionally and/or alternatively based on the content retrieved. For example, it may be learned over time that user input for an interactive website (e.g., a browser-based game) is likely to be common, such that an absence of user input data may indicate content access issues, whereas user input data for a static website (e.g., a news article) is likely to be relatively less common.

In step 609, it is determined whether the user behavior analysis performed in step 608 suggests a poor user experience. If not, the content is provided in step 611, and the flow chart ends. If so, the flow chart proceeds to step 610. In step 610, one or more causes for the user behavior analyzed in step 608 (e.g., the poor user experience) may be determined. If a poor connection is suggested by the user behavior in step 608, then the system determines which portions of the path used to deliver the content may be at fault. For example, a particular hop in a path (e.g., a hop between the intermediary computing device 403 and the second computing device 402) may be undesirably slow, causing the user to be bored and move their mouse around erratically. Such causes may be later used to determine a different path for retrieval of the requested content. For example, such causes may be used to train a machine learning algorithm used in step 604 to determine the user experience metrics, such that future user experience metrics are based on historical user experience with various paths.

After the one or more causes for the poor connection are determined in step 610, path re-selection may be performed by returning to step 602. As such, based on determining that a user's experience with retrieving content via a certain path is poor, the path to retrieve such content may be re-selected.

Figure 7:
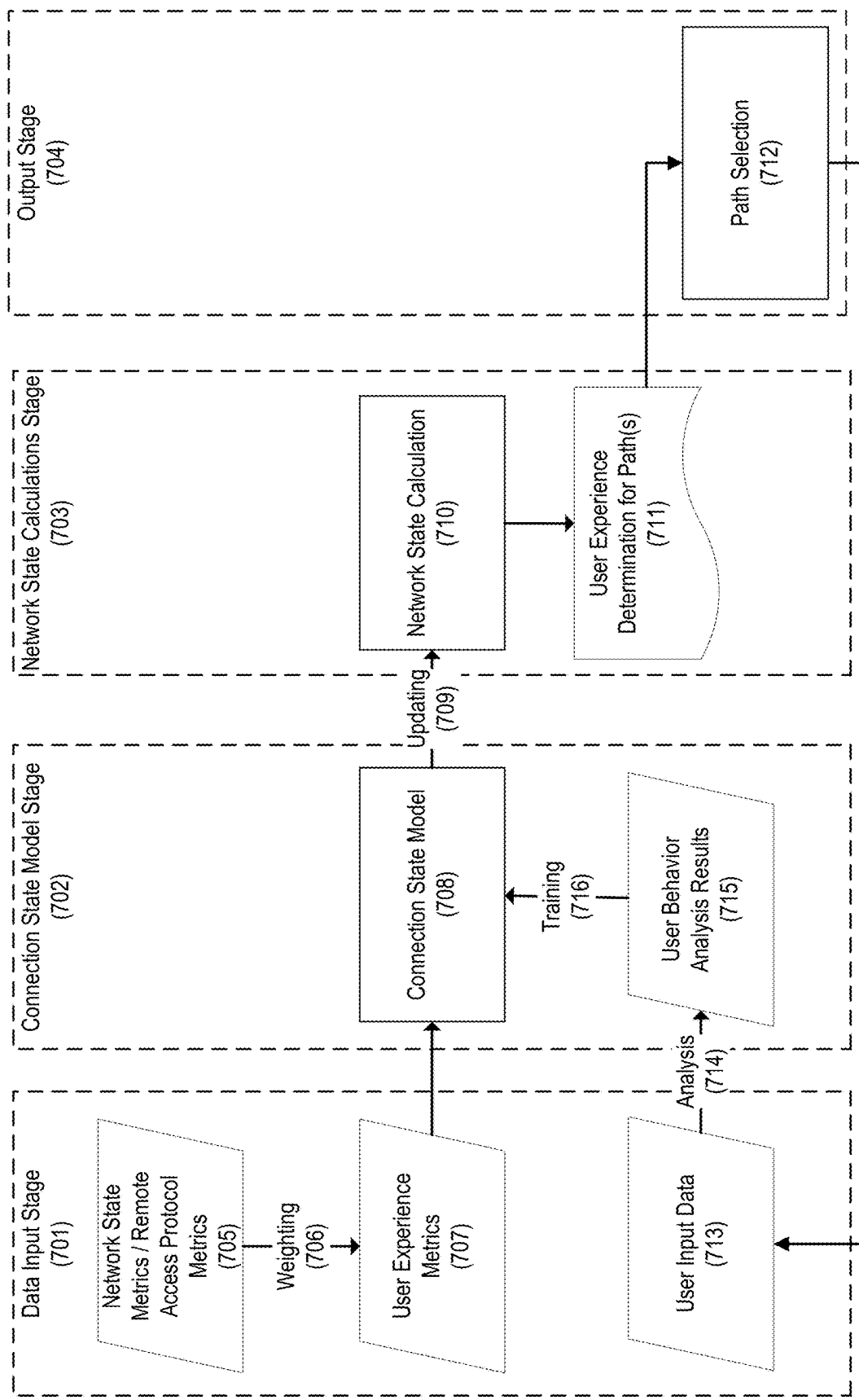
FIG. 7 is a process flow chart for a first computing device and a second computing device.

As an example of the process depicted in FIG. 7, a first computing device may receive, from a second computing device (e.g., a mobile device, such as a smartphone) a request for content stored on the first computing device. For example, the second computing device may request a web page stored on the first computing device. A first state of a first connection between the first computing device and the second computing device may be determined. A second state of a second connection between the first computing device and the second computing device may be determined. The first connection may be configured to transfer the content from the first computing device to the second computing device via a first protocol (e.g., directly, and via HTTP). The second connection may be different from the first connection, may comprise at least one intermediary computing device, and may be configured to transfer the content from the first computing device to the second computing device via a second protocol (e.g., using a remote access protocol). The at least one intermediary computing device may be configured to deliver video (e.g., via the second protocol) corresponding to an application comprising the content (e.g., video comprising a web browser displaying a requested web page). Determining such states may comprise determining a plurality of latency values associated with devices in the connection, such as the first computing device, second computing device, and/or the at least one intermediary computing device, and determining a projected latency for the connection based on the plurality of latency values (e.g., by weighting the plurality of latency values based on a history of user experience metrics). Based on a comparison of the first state and the second state, one of the first connection and the second connection may be selected. The connection selected need not be the connection with the least latency (e.g., the least projected latency), and may be the connection associated with a superior user experience metric. For example, a user experience metric may be determined, and a connection may be selected based on that user experience metric, even though the connection is associated with a higher latency than another connection. The selected connection may be used to provide the content from the first computing device to the second computing device, which may thereby avoid delays associated with the non-selected connection. Based on user input data received from the second computing device, an indication of user behavior may be determined, and, if the user behavior indicates unsatisfactory network conditions, a third connection may be selected, and/or the non-selected connection may be selected.

FIG. 7 shows a process flow chart with respect to the first computing device 401 and the second computing device 402. FIG. 7 is divided into four stages: a data input stage 701, a connection state model stage 702, a network state calculations stage 703, and an output stage 704. All or some of the processes and/or steps shown in FIG. 7 may be performed by the first computing device 401, the second computing device 402, the intermediary computing device 403, and/or an administrative computing device. The process flow chart shown in FIG. 7 may generally correspond to the steps shown in FIG. 6. For example, the process described with respect to the data input stage 701 and the connection state model stage 702 may be the same or similar to that described with respect to, e.g., step 602, step 603, and step 604. As another example, the process described with respect to the network state calculations stage 703 and the output stage 704 may be the same or similar to that described with respect to, e.g., step 605 and step 606.

In the data input stage 701, the network state metrics and the remote access protocol metrics 705 may be weighted, in step 706, to become user experience metrics 707. Such metrics may then proceed to the connection state model stage 702.

In the connection state model stage 702, the network state metrics and the remote access protocol metrics 705, and/or the user experience metrics 707 may be evaluated by a connection state model 708. The connection state model 708 may be used to train (e.g., weight and/or otherwise modify) network state metrics, remote access protocol metrics, and/or user experience metrics based on user behavior analysis results 715, and may thereby emphasize which of such metrics matter with respect to user experience. As such, the connection state model 708 update such metrics in step 709. For example, based on determining that a particular network state metric (e.g., the bandwidth of a particular hop) is not particularly important with respect to user experience, the connection state model 708 may weight that particular network state metric in a manner which discounts it relative to other network state metrics. As such, the connection state model stage 702 may be used to modify data received in the data input stage 701 based on, e.g., a history of user experience given particular network conditions. As another example, based on a history of user experiences, the weights of the user experience metrics 707 may be updated to prioritize the latency of remote access protocols over other protocols. After updating such metrics in step 709, the network state metrics and the remote access protocol metrics 705, the user experience metrics 707, and/or any other data may proceed to the network state calculations stage 703.

In the network state calculations stage 703, a network state calculation 710 may use the metrics from the connection state model stage 702 to determine projected user experiences across one or more paths available between, e.g., the first computing device 401 and the second computing device 402. Such projected user experiences are indicated as user experience determinations for one or more paths 711. The network state calculation 710 may comprise using the metrics received from the connection state model stage 702 to rank a plurality of available paths based on their likely user experience. For example, there may be three paths (e.g., the paths depicted in FIG. 5) available to a user of a first computing device, and the network state calculation 710 may comprise determining, using the metrics from the data input stage 701 as weighted in step 706 and/or as modified by the connection state model 708, a ranking, based on the metrics, of each path. Such a ranking may be, for example, a projected user experience (e.g., from best to worst) for each path of a plurality of paths available. As such, the resulting analysis, the user experience determination for the one or more paths 711, may comprise, e.g., a ranking of paths based on their projected user experience. The user experience for the one or more paths 711 may then proceed to the output stage 704.

In the output stage 704, path selection 712 may be performed. For example, if the user experience determination for the one or more paths 711 is a ranking of a plurality of paths based on their likely user experience, then the highest-ranked path may be selected. The process may then proceed back to the data input stage 701, and more particularly retrieval of user input data 713.

Returning to the data input stage 701, the user input data 713 may be retrieved, and analysis 714 of the user input data 713 may be performed, such that, in the connection state model stage 702, user behavior analysis results 715 may be determined. Such a process may be the same or similar to the process described with respect to, e.g., step 607, step 608, step 609, and step 610. The user behavior analysis results 715 may be used by the connection state model 708 to train 716 the metrics sent to the network state calculation 710. For example, if the path selection 712 results in the user behavior analysis results 715 indicating a poor user experience, then a similar path selection may be discouraged by appropriately modifying weighting values applied by the connection state model 708 during the updating in step 709.

The process flow diagram shown in FIG. 7 illustrates how the system may learn, over time, how to select paths with better user experience. A machine learning algorithm may be implemented to perform such steps. For example, a machine learning algorithm may be trained based on the user behavior analysis results 715, and may further be implemented as part of the analysis 714 and/or the updating in step 709 such that metrics (e.g., the network state metrics and the remote access protocol metrics 705, and/or the user experience metrics 707) are modified based on the user behavior analysis results 715. The machine learning algorithm may thereby learn when implementation of remote access to intermediary devices may improve a user's experience of retrieving content.

Figure 8:
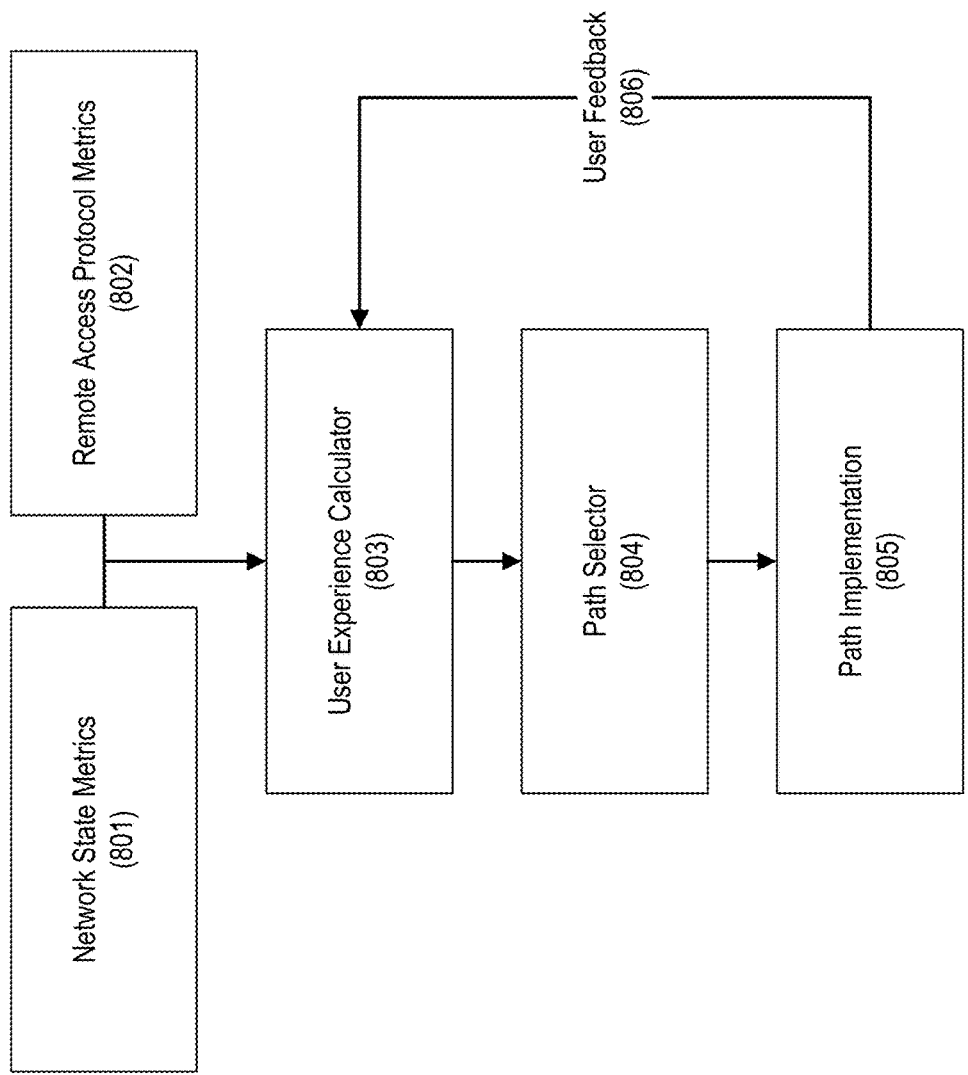
FIG. 8 is a high level flow chart for path selection.

FIG. 8 shows a high level flow chart for path selection. FIG. 8 may be a simplified version of FIG. 6 such that the steps of FIG. 6 may be the same or similar as depicted in FIG. 8, and is simplified in part to illustrate how user feedback may be used to learn, over time, user experience. Network state metrics 801 and remote access protocol metrics 802 may be retrieved in step 602 and step 603 and as described with respect to the data input stage 701, may be provided to a user experience calculator 803. The user experience calculator 803 may be, e.g., software executing on the first computing device 401, the second computing device 402, and/or the intermediary computing device 403. For example, the user experience calculator 803 may be part of remote access software executing on the first computing device 401 which enables remote access to applications (e.g., web browsers) hosted on the intermediary computing device 403. The user experience calculator 803, which may perform functions described with respect to the connection state model stage 702, the network state calculations stage 703, and/or step 604, may determine one or more user experience metrics, perform one or more network state calculations, and/or may rank available paths based on such user experience metrics and/or network state calculations. Output from the user experience calculator 803 may be sent to a path selector 804 which, similar to the process described in step 605 and/or in the output stage 704, may select a path of one or more paths. The selected path from the path selector 804 may be implemented by the path implementation step 805, which may perform a process the same or similar as step 605 and/or as described with respect to the output stage 704. Then, user feedback 806, as described with respects to step 607, step 608, step 609, step 610, the data input stage 701, and/or the connection state model stage 702 may be collected and used by the user experience calculator 803.

Figure 9:
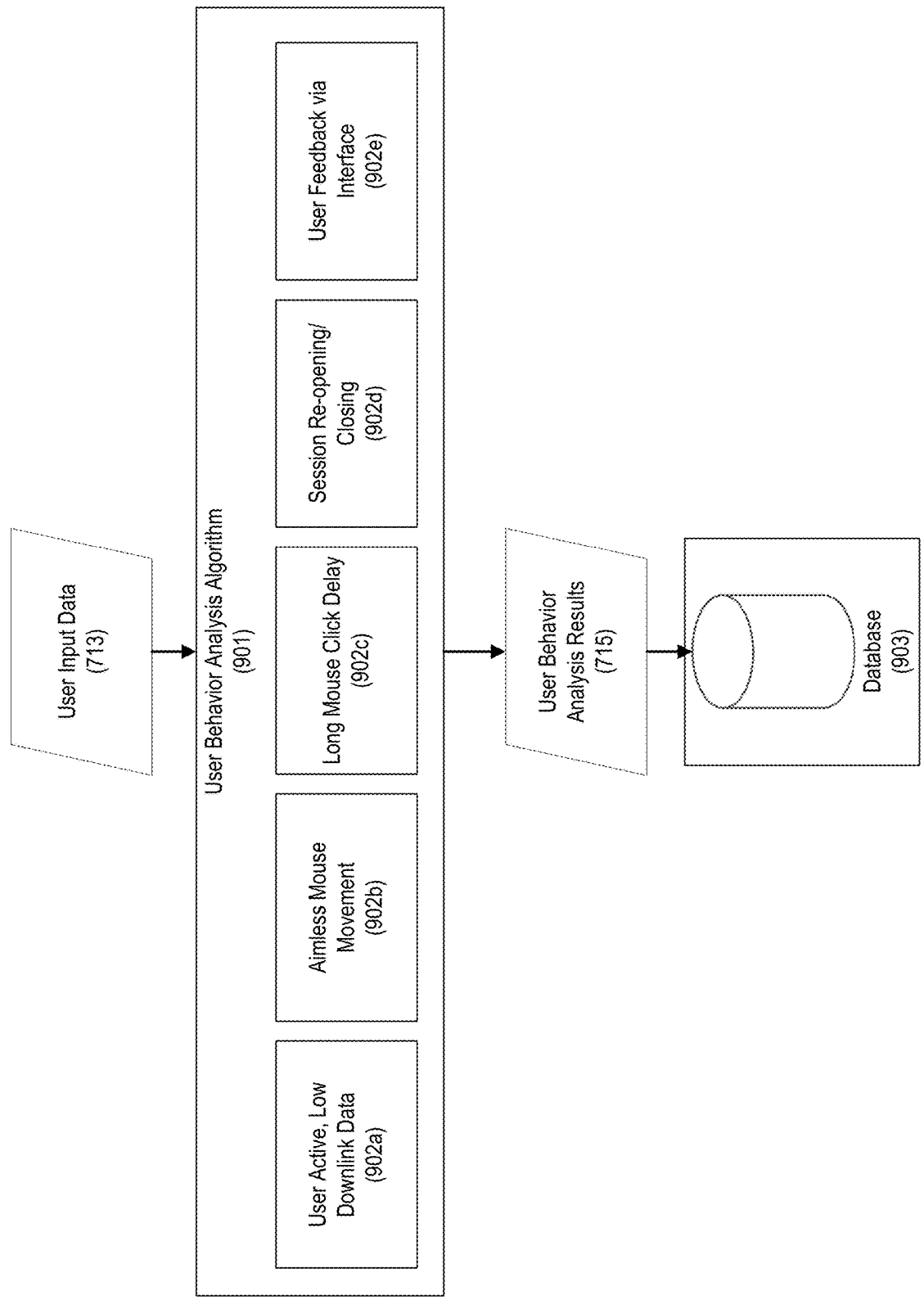
FIG. 9 depicts a process for user behavior analysis based on the user input data.

FIG. 9 shows user behavior analysis based on the user input data 713. The user input data 713 may be input into a user behavior analysis algorithm, which may be configured to determine one or more indicia of user experience. Five examples of indications of poor user experience are provided. If the user is active but there is relatively low downlink data being transmitted (box 902a), this may indicate that a user is using a remote access application but not downloading and/or otherwise engaging with content (e.g., the content 404). If the user is moving a mouse around aimlessly (e.g., moving at a velocity and/or acceleration with a variance over time that exceeds a threshold, moving around portion of a display not associated with content, moving in defined patterns, or the like) (box 902b), and/or if there is a long delay between when the user clicks using their mouse (box 902c), such actions may indicate that the user is not engaging with requested content, and that the user's experience with the content may be poor. If the user attempts to re-open a remote access session and/or close an existing remote access session (box 902d), such a step may indicate that the user's experience in retrieving the content may be poor. If the user is presented (e.g., via a user interface) with an opportunity to provide feedback regarding the user's retrieval of content (e.g., a thumbs up and/or thumbs down icon along with a request for feedback on network connectivity), and if the user responds negatively, such an indication may indicate that the user's experience in retrieving the content may be poor. All such considerations may result in the user behavior analysis results 715. The user behavior analysis results 715 may be stored in a database 903 which, e.g., may be used by the connection state model 708 and/or during the network state calculation 710.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   comparing a plurality of paths that connect first and second computing devices by comparing:
      first user experience metrics based on first network state metrics and remote access protocol metrics that correspond to a first path that connects the first and second computing device via at least one intermediary device, wherein the at least one intermediary device is configured to transfer content using a remote access protocol; and
      second user experience metrics based on second network state metrics that correspond to a second path that does not use the remote access protocol;
   selecting, based on the comparing, the first path through which to transfer the content to the first computing device; and
   providing the content from the second computing device to the first computing device via the first path.

2. The method of claim 1, wherein selecting the one of the plurality of paths comprises:
   determining, based on user input data, an indication of user behavior associated with the content.

3. The method of claim 1, wherein
   the first network state metrics comprise a projected latency of the first path.

4. The method of claim 3, wherein the projected latency is based on a history of user experience metrics.

5. The method of claim 1, wherein the remote access protocol is configured to provide, via the at least one intermediary device, images corresponding to an application, executing in a remote access environment, comprising the content.

6. The method of claim 1, wherein the intermediary device is configured to transfer content via the remote access protocol and at least one other protocol.

7. The method of claim 1, wherein comparing the plurality of paths comprises:
   comparing the first network state metrics and the second network state metrics.

8. A computing device comprising:
   one or more processors; and
   memory storing instructions that, when executed by the one or more processors, cause the computing device to:
      compare a plurality of paths that connect first and second computing devices by comparing:
         first user experience metrics based on first network state metrics and remote access protocol metrics that correspond to a first path that connects the first and second computing device via at least one intermediary device, wherein the at least one intermediary device is configured to transfer content using a remote access protocol; and
         second user experience metrics based on second network state metrics that correspond to a second path that does not use the remote access protocol;
      select, based on the comparing, the first path through which to transfer the content to the first computing device; and
      provide the content from the second computing device to the first computing device via the first path.

9. The computing device of claim 8, wherein the instructions, when executed by the one or more processors, cause the computing device to select the one of the plurality of paths by causing the computing device to:
   determine, based on user input data, an indication of user behavior associated with the content.

10. The computing device of claim 8, wherein the
    first network state metrics comprise a projected latency of the first path.

11. The computing device of claim 10, wherein the projected latency is based on a history of user experience metrics.

12. The computing device of claim 8, wherein the remote access protocol is configured to provide, via the at least one intermediary device, images corresponding to an application, executing in a remote access environment, comprising the content.

13. The computing device of claim 8, wherein the intermediary device is configured to transfer content via the remote access protocol and at least one other protocol.

14. The computing device of claim 8, wherein the instructions, when executed by the one or more processors, cause the computing device to compare the plurality of paths by causing the computing device to:
   compare the first network state metrics and the second network state metrics.

15. One or more non-transitory computer-readable media comprising instructions that, when executed by one or more processors of a computing device, cause the computing device to:
   compare a plurality of paths that connect first and second computing devices by comparing:
      first user experience metrics based on first network state metrics and remote access protocol metrics that correspond to a first path that connects the first and second computing device via at least one intermediary device, wherein the at least one intermediary device is configured to transfer content using a remote access protocol; and second user experience metrics based on second network state metrics that correspond to a second path that does not use the remote access protocol;

select, based on the comparing, the first path through which to transfer the content to the first computing device; and provide the content from the second computing device to the first computing device via the first path.

16. The computer-readable media of claim 15, wherein the instructions, when executed, cause the computing device to select the one of the plurality of paths by causing the computing device to:

determine, based on user input data, an indication of user behavior associated with the content.

17. The computer-readable media of claim 15, wherein the first network state metrics comprise a projected latency of the first path.

18. The computer-readable media of claim 17, wherein the projected latency is based on a history of user experience metrics.

19. The computer-readable media of claim 15, wherein the remote access protocol is configured to provide, via the at least one intermediary device, images corresponding to an application, executing in a remote access environment, comprising the content.

20. The computer-readable media of claim 15, wherein the intermediary device is configured to transfer content via the remote access protocol and at least one other protocol.

* * * * *